UNITED STATES PATENT OFFICE.

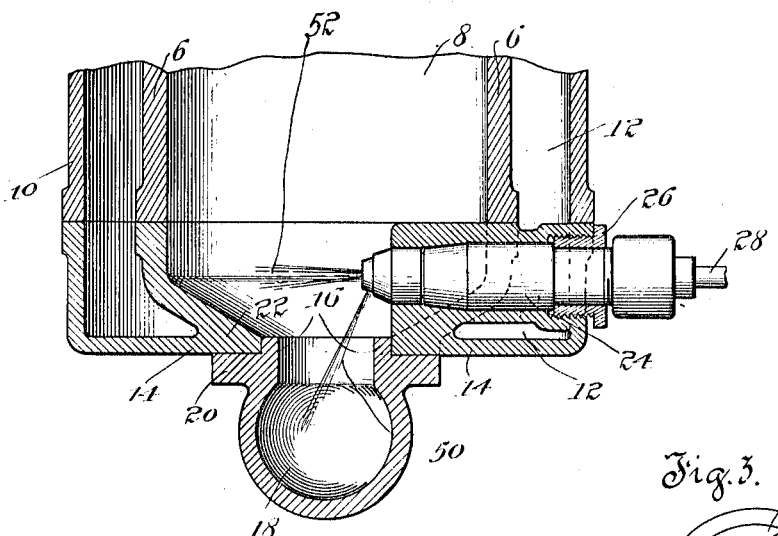
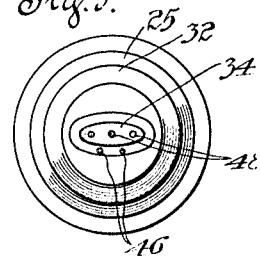
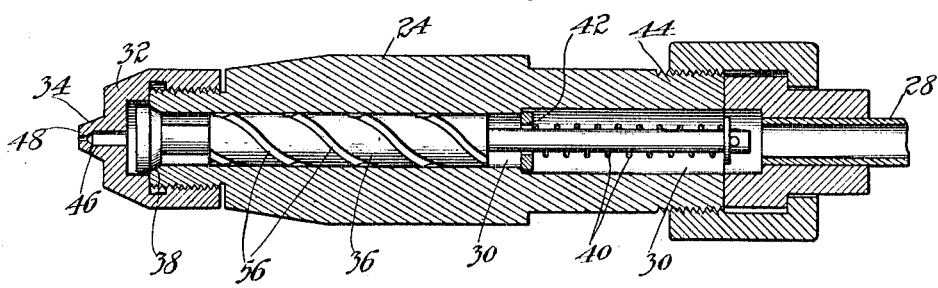

LLOYD YOST AND CHARLES B. JAHNKE, OF BELOIT, WISCONSIN, ASSIGNORS TO FAIRBANKS, MORSE & COMPANY, OF CHICAGO, ILLINOIS, A CORPORATION OF ILLINOIS.

DIVIDED-SPRAY INJECTION-ENGINE.

1,096,585.  Specification of Letters Patent.  Patented May 12, 1914.

Application filed June 30, 1913. Serial No. 776,523.

*To all whom it may concern:*

Be it known that we, LLOYD YOST and CHARLES B. JAHNKE, citizens of the United States, residing at Beloit, in the county of Rock and State of Wisconsin, have invented a certain new and useful Improvement in Divided-Spray Injection-Engines, of which the following is a specification.

This invention relates to oil engines of the combustion type or to that class in which the oil fuel is mechanically sprayed or injected into the combustion space of the engine, and more particularly such devices in which the vaporization and ignition of the injected oil fuel are caused at least partially by the heat of some purposely hot portion of the wall of the combustion space of the engine.

The object of this invention is to provide a device in which the temperature of this hot or igniter portion of the combustion space is maintained substantially constant regardless of varying loads upon the engine, thereby insuring uniform satisfactory operation of the engine.

The invention consists in a device which can be easily and simply constructed, which operates satisfactorily and efficiently to produce the desired result and is not readily liable to get out of order.

More in detail, the invention consists in providing the oil injecting device with means whereby a constant quantity of oil fuel is sprayed or thrown upon the hot or igniter portion of the wall of the combustion space of the engine regardless of variations in the total quantity of oil fuel injected into the engine.

The invention further consists in means for accurately directing the oil fuel for the igniter to it, and in other details and features of construction which will be hereafter more fully described and claimed.

Referring to the drawings in which is shown a device illustrating the preferred form of this invention, Figure 1 is a sectional detail view of the end of an engine cylinder, while Fig. 2 is a sectional detail view through one form of nozzle which may be used in connection therewith. Fig. 3 shows a nozzle tip having a plurality of openings 46 and a plurality of openings 48.

As the invention relates only to the combustion space of an engine, only the end of the cylindrical wall 6 having within it such a combustion space 8 is shown. This cylinder wall 6 is inclosed within an outer cylinder 10 so arranged as to provide a water space or jacket 12 between the two walls 6 and 10. In the end of the combustion space 8 is an opening 14 into which fits the open end 16 of a hollow igniter chamber 18 of any suitable shape. The igniter chamber is in fact a part of the combustion chamber but for convenience of description is separately designated. It is to be noticed that this igniter chamber 18 is not water jacketed as is the combustion space 8 of the engine. This igniter chamber may be secured to the end of the main cylinder by any suitable means through flange 20, forming no part of the invention and, therefore, not shown.

Entering one side of the combustion space 8 is an injection nozzle device 24 of any suitable construction, one form of which is shown in detail in Fig. 2. This nozzle is held in place by a suitable retaining device 26 of any suitable form and is supplied by a pipe 28 leading away to any source, not shown, of oil fuel. The particular form of nozzle here illustrated is provided with a central passageway 30 leading to the forward or cap end 32 of the nozzle, terminating in the discharge point or tip 34, while inside of the nozzle is a valve member 36 seated at 38 through the agency of a spring device 40 having suitable engagement at 42 and 44 inside the nozzle space 30. The oil in passing from the space 30 in the nozzle to the discharge openings 46 and 48 passes through passageways 56 on the circumference of the valve member provided for the purpose.

The nozzle tip 34 is provided with two distinct openings or sets of openings 46 and 48. Opening 46 is so located with reference to all of the parts heretofore described that when oil is supplied under pressure to the nozzle and consequently to the nozzle tip a stream of oil will be injected through this discharge opening 46, in a spray 50 (Fig. 1) into the interior of ignition chamber 18. On the other hand, discharge opening 48 is so located that some portion of the oil fuel will be driven out through the opening 48 in a spray 52 into the interior of the combustion space 8, and not into the igniter chamber 18. In the drawings, only one discharge opening 46 and one discharge opening 48 is shown but either one of these openings may be multiplied as is found necessary to satisfy the design of the particular engine under construction, for by properly choosing the sizes and the number of these openings directed toward two different parts of the combustion space of the cylinder any desired proportion of fuel may be injected into the igniter. For each size of engine this is best determined by experiment and the resulting design will depend upon the relative volumes, amount of compression used and the amount of cooling, etc.

In the operation of the device, a gas torch or other external heating device should be first externally applied to the igniter chamber 18. As soon as this is heated to a sufficient temperature said source of external heat is removed and the oil admitted to the nozzle 24. One portion of the oil fuel passes through the discharge port 46 and forms the spray 50 which enters and strikes upon the heated walls of the igniter chamber 18, and is ignited by the heat of said igniter with the result that the oil not only itself burns but it also ignites that portion of the oil fuel which has passed through the opening 48 in the form of a spray 52 into the interior of the combustion space 8. This combustion of the oil fuel within the cylinder reheats the igniter chamber as well as the interior wall 6 of the combustion space. The water within the water space or jacket 12 carries away the heat from the wall 6 but does not in any way affect the walls of the igniter chamber 18 so that the walls of this chamber remain sufficiently hot to ignite the next injection of oil on the next stroke of the engine; the successive injections of oil being controlled by means not here shown and forming no part of this invention, at each successive stroke of the engine.

The device may be used in connection with either a horizontal or a vertical engine and with an engine of two or more strokes per cycle. Again, the device is not limited to particular means for the injection of the oil fuel.

By the use of this device a constant portion of the oil fuel is thrown or injected into the igniter chamber 18 at each stroke of the engine, and as all of the fuel thrown into the igniter chamber will burn in it, (it being understood that the design and size of the igniter chamber allow a proper amount of air to enter it by means not shown for this purpose,) a proportional amount of heat will at all times be generated within the igniter chamber. The igniter chamber will remain practically at constant temperature regardless of variations in the load of the engine because as higher loads are placed upon the engine more heat will be absorbed from the igniter walls in vaporizing the portion of oil thrown into it at the same time that more heat is generated by the combustion of a larger quantity of oil in the igniter chamber.

It is to be noticed that the spray 50 from the discharge port 48 is directed positively into the igniter chamber in such a way that it can not go anywhere else, thus doing away with and avoiding the unsatisfactory use of splash plates which have heretofore sometimes been used for deflecting a part of one unitary stream of oil into the igniter chamber, it being well known that accumulations of dirt of any kind upon the splash plates destroy partially or wholly the action of the device, particularly at light loads.

When the device is applied to a vertical engine the igniter chamber 18 is located at the top of the cylinder so that it will not become filled up with residuals draining into it.

Having thus described our invention, what we claim as new and desire to secure by Letters Patent, is:

1. In the art described, the combination of a cylinder wall having within it a combustion space, means for cooling portions of the wall of said cylinder while leaving an igniter portion of the wall of said combustion space uncooled, a single means for conducting oil fuel into said combustion space, said conducting means terminating in two separate openings, or sets of openings one of these openings or sets of openings adapted to discharge oil fuel against the igniter portion of the cylinder wall, the other being adapted to discharge oil fuel against some other portion of the interior of the cylinder wall, for the purposes set forth.

2. In the art described, an engine cylinder containing within it a combustion space, means for cooling the wall of said cylinder, a supplemental non-cooled ignition chamber communicating with said combustion space, and a single means for conducting oil fuel inside the device, said conducting means terminating in two ports or sets of ports, one of these ports or sets of ports directed to discharge oil fuel into the supplemental ignition chamber and the other port being directed to discharge oil fuel into another predetermined portion of the combustion chamber, for the purposes set forth.

3. In the art described, an engine cylinder containing within it a combustion space, means for cooling the walls of said cylinder, a supplemental non-cooled ignition chamber communicating with the combustion space, a single nozzle entering the wall of the cylinder having a tip provided with two separated openings or sets of openings, one of said openings or sets of openings being pointed directly into the ignition chamber, the other being directed into the combustion space, all of the parts being arranged and disposed substantially as shown and described for the purposes set forth.

In witness whereof we have hereunto subscribed our names in the presence of two witnesses.

LLOYD YOST.
CHARLES B. JAHNKE.

Witnesses:
W. C. ACKLEY,
C. B. RATHBUN.